(12) United States Patent
Wu

(10) Patent No.: US 11,495,075 B2
(45) Date of Patent: Nov. 8, 2022

(54) DISTRIBUTED VOTING SYSTEM, METHOD, APPARATUS, COMPUTER DEVICE AND READABLE STORAGE MEDIUM

(71) Applicant: BOE TECHNOLOGY GROUP CO., LTD., Beijing (CN)

(72) Inventor: Zheng Wu, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 339 days.

(21) Appl. No.: 16/637,860

(22) PCT Filed: Jul. 16, 2019

(86) PCT No.: PCT/CN2019/096155
§ 371 (c)(1),
(2) Date: Feb. 10, 2020

(87) PCT Pub. No.: WO2020/015635
PCT Pub. Date: Jan. 23, 2020

(65) Prior Publication Data
US 2020/0250912 A1 Aug. 6, 2020

(30) Foreign Application Priority Data
Jul. 18, 2018 (CN) .......................... 201810793077.7

(51) Int. Cl.
*H04L 9/30* (2006.01)
*H04L 9/32* (2006.01)
(Continued)

(52) U.S. Cl.
CPC .............. *G07C 13/00* (2013.01); *H04L 9/085* (2013.01); *H04L 9/0819* (2013.01); *H04L 9/30* (2013.01); *G06F 21/105* (2013.01)

(58) Field of Classification Search
CPC .......... H04L 9/30; H04L 9/3247; G06Q 30/02
(Continued)

(56) References Cited

U.S. PATENT DOCUMENTS

| 2017/0109955 | A1   | 4/2017 | Ernest et al. |
| 2018/0191503 | A1 * | 7/2018 | Alwar ............... G06Q 20/10 |

FOREIGN PATENT DOCUMENTS

| CN | 106341460 A | 1/2017 |
| CN | 107145768 A | 9/2017 |

(Continued)

OTHER PUBLICATIONS

Liu, Jieliang "Master Dissertation"; Inner Mongolia University; Jun. 8, 2017.
Liu, Yi, et al. "An E-Voting Protocol Based on Blockchain"; Department of Computer Science and Engineering Southern University of Science and Technology, Shenzhen, China.
(Continued)

*Primary Examiner* — Toan C Ly
(74) *Attorney, Agent, or Firm* — Nath, Goldberg & Meyer; Joshua B. Goldberg

(57) ABSTRACT

The disclosure relates to a distributed voting system, method, apparatus, a computer device and a readable storage medium. The distributed voting system includes: a first node configured to broadcast voting invitation information; a second node configured to generate and broadcast voting commitment information according to the voting invitation information wherein the voting commitment information includes first signature information generated by the second node according to its own secret key for the voting commitment information; and a third node configured to determine that the voting commitment information is valid according to pre-acquired public key information of the second node and the first signature information, wherein the secret key of the second node uniquely corresponds to a public key of the second node, and a voting record is generated according to the voting commitment information (Continued)

and the voting record is stored in a first data block of the system.

19 Claims, 5 Drawing Sheets

(51) Int. Cl.
    *G06Q 30/02*     (2012.01)
    *G07C 13/00*     (2006.01)
    *H04L 9/08*     (2006.01)
    *G06F 21/10*     (2013.01)

(58) Field of Classification Search
    USPC .......................................................... 235/51
    See application file for complete search history.

(56) References Cited

FOREIGN PATENT DOCUMENTS

| | | |
|---|---|---|
| CN | 107294727 A | 10/2017 |
| CN | 107622385 A | 1/2018 |
| CN | 107833135 A | 3/2018 |
| CN | 108933656 A | 12/2018 |

OTHER PUBLICATIONS

Bartolucci, Silvia, et al. "SHARVOT: secret SHARe-based VOTing on the blockchain"; Mar. 13, 2018.
First Office Action dated Dec. 13, 2019 corresponding to Chinese application No. 201810793077.7.
Second Office Action dated Jun. 30, 2020 corresponding to Chinese application No. 201810793077.7.

\* cited by examiner

DISTRIBUTED VOTING SYSTEM, METHOD, APPARATUS, COMPUTER DEVICE AND READABLE STORAGE MEDIUM

CROSS-REFERENCE TO RELATED APPLICATION

This is a National Phase Application filed under 35 U.S.C. 371 as a national stage of PCT/CN2019/096155, filed on Jul. 16, 2019, an application claiming the priority of Chinese Patent Application No. 201810793077.7, filed on Jul. 18, 2018, the contents of which are incorporated herein in their entirety by reference.

FIELD OF INVENTION

The disclosure relates to the field of information technology and particularly to a distributed voting system, method, apparatus, a computer device and a readable storage medium.

BACKGROUND

With the development of Internet technology, online platforms have been widely used in various fields. For example, as a platform for viewing artistic works and sharing artistic creations, an online art gallery can expand the popularity of the artistic works and increase the public attention to the artistic works or authors. The online art gallery can further hold the promotion activities (e.g., voting evaluation and the like) of the artistic works on the online platform regularly or irregularly.

BRIEF SUMMARY

The disclosure provides a distributed voting system, method, apparatus, a computer device and a readable storage medium, which are applicable to a voting process of the online art gallery or other platforms.

According to an aspect of the disclosure, a distributed voting system is provided, which includes: a first node configured to broadcast voting invitation information; a second node configured to generate voting commitment information according to the voting invitation information and broadcast the voting commitment information, where the voting commitment information includes first signature information generated by the second node according to its own secret key for the voting commitment information; and a third node configured to determine that the voting commitment information is valid according to pre-acquired public key information of the second node and the first signature information in response to receiving the voting commitment information, where the secret key of the second node uniquely corresponds to a public key of the second node, a voting record is generated according to the voting commitment information and the voting record is stored in a first data block of the system.

In an embodiment, the voting invitation information includes identity information of an object to be voted, the voting commitment information further includes identity information of the second node, the identity information of the object to be voted and voting time information, and the third node is configured to generate the voting record including the identity information of the second node, the identity information of the object to be voted and the voting time information.

In an embodiment, the third node is configured to determine that the voting commitment information is edited and generated by the second node according to the public key information of the second node and the first signature information, and determine that an account balance corresponding to the second node is not below a first preset value according to the identity information of the second node and historical voting records stored in the system.

In an embodiment, the second node is configured to send voting request information to the first node, and reduce the account balance corresponding to the second node according to the first preset value, and the first node is configured to increase an account balance corresponding to the first node and update a vote result of the object to be voted according to the first preset value in response to receiving the voting request information.

In an embodiment, the distributed voting system further includes a fourth node or cloud platform configured to broadcast voting launch information, where the first node is configured to broadcast the voting invitation information in response to receiving the voting launch information, and the second node is configured to increase the account balance corresponding to the second node according to a second preset value in response to receiving the voting launch information, and broadcast the public key information of the second node, where the public key information of the second node includes the identity information of the second node and the public key of the second node.

In an embodiment, the third node is configured to determine an input value causing an output value of a first preset algorithm to meet a set condition, generate the first data block according to the output value and identity information of a data block generated most recently in the system, and broadcast the input value, the output value and identity information of the first data block so that other nodes in the system confirms that the first data block corresponding to the identity information of the first data block is generated according to the input value, the output value and the first preset algorithm.

In an embodiment, the third node is configured to increase an account balance corresponding to the third node according to a third preset value in response to that other nodes in the system confirms that the first data block is generated.

In an embodiment, the first node is configured to broadcast copyright registration request information including a digital content identity of the object to be voted, where the distributed voting system further includes a fifth node configured to determine that the digital content identity is an unique value in the system in response to receiving the copyright registration request information, and generate a copyright registration record of the object to be voted according to the copyright registration request information and store the copyright registration record in a second data block of the system.

In an embodiment, the first node is configured to generate a content identity of the object to be voted based on a second preset algorithm and content information of the object to be voted, and generate the digital content identity based on a third preset algorithm, the content identity of the object to be voted and copyright owner identity information of the object to be voted.

In an embodiment, the copyright owner identity information of the object to be voted is a public key of the first node.

In an embodiment, the fifth node is configured to determine that the copyright registration request information further includes at least one of status information of a copyright owner of the object to be voted, right statement information of the object to be voted, status information of an author of the object to be voted and address information of the copyright owner of the object to be voted before determining that the digital content identity is the unique value in the system.

In an embodiment, the copyright registration request information further includes second signature information generated by the first node according to its own secret key for the copyright registration request information, and the fifth node is configured to determine that the copyright registration request information is edited and generated by the first node according to pre-acquired public key information of the first node and the second signature information, where the secret key of the first node uniquely corresponds to the public key of the first node.

According to another aspect of the disclosure, a distributed voting method is provided, which includes: receiving, by a first node, voting commitment information broadcasted by a second node, where the voting commitment information is generated by the second node according to voting invitation information broadcasted by a third node, and the voting commitment information includes signature information generated by the second node according to its own secret key for the voting commitment information; determining, by the first node, that the voting commitment information is valid according to pre-acquired public key information of the second node and the signature information, where the secret key of the second node uniquely corresponds to a public key of the second node; and generating, by the first node, a voting record according to the voting commitment information, and storing the voting record in a current data block of a distributed system including the first, second and third nodes.

In an embodiment, the voting invitation information includes identity information of an object to be voted, the voting commitment information further includes identity information of the second node, the identity information of the object to be voted and voting time information, and the step of generating, by the first node, the voting record according to the voting commitment information includes: generating, by the first node, the voting record including the identity information of the second node, the identity information of the object to be voted and the voting time information.

In an embodiment, determining, by the first node, that the voting commitment information is valid, includes: determining, by the first node, that the voting commitment information is edited and generated by the second node according to the public key information of the second node and the signature information; and determining, by the first node, that the account balance corresponding to the second node is not below a preset value according to the identity information of the second node and historical voting records stored in the distributed system.

In an embodiment, the current data block is obtained by: determining, by the first node, an input value causing an output value of a preset algorithm to meet a set condition; generating, by the first node, the current data block according to the output value and identity information of a data block generated most recently in the distributed system; and broadcasting, by the first node, the input value, the output value and identity information of the current data block so that other nodes in the distributed system confirms that the current data block corresponding to the identity information of the current data block is generated according to the input value, the output value and the preset algorithm.

According to yet another aspect of the disclosure, another distributed voting method is provided, which includes: receiving, by a first node, voting invitation information broadcasted by a second node; generating, by the first node, voting commitment information according to the voting invitation information, where the voting commitment information includes signature information generated by the first node according to its own secret key for the voting commitment information; and broadcasting, by the first node, the voting commitment information so that a third node determines that the voting commitment information is valid according to pre-acquired public key information of the first node and the signature information, generates a voting record according to the voting commitment information, and stores the voting record in a current data block of a distributed system, where the secret key of the first node uniquely corresponds to a public key of the first node, and the distributed system includes the first, second and third nodes.

In an embodiment, the voting invitation information includes identity information of an object to be voted, and the voting commitment information further includes identity information of the first node, the identity information of the object to be voted and voting time information so that the third node generates the voting record including the identity information of the first node, the identity information of the object to be voted and the voting time information.

According to yet another aspect of the disclosure, a distributed voting apparatus is provided, which includes: a voting data receiving module configured to receive voting commitment information broadcasted by a first node, where the voting commitment information is generated by the first node according to voting invitation information broadcasted by a second node, and the voting commitment information includes signature information generated by the first node according to its own secret key for the voting commitment information; a voting data verification module configured to determine that the voting commitment information is valid according to pre-acquired public key information of the first node and the signature information, where the secret key of the first node uniquely corresponds to the public key of the first node; and a voting trade writing module configured to generate a voting record according to the voting commitment information, and store the voting record in a current data block of a distributed system including the distributed voting apparatus, the first node and the second node.

According to yet another aspect of the disclosure, another distributed voting apparatus is provided, which includes: a voting invitation receiving module configured to receive voting invitation information broadcasted by a first node; a voting commitment generating module configured to generate voting commitment information according to the voting invitation information, where the voting commitment information includes signature information generated by the apparatus according to its own secret key for the voting commitment information; and a voting commitment broadcasting module configured to broadcast the voting commitment information so that a second node determines that the voting commitment information is valid according to pre-acquired public key information of the apparatus and the signature information, generates a voting record according to the voting commitment information, and stores the voting record in a current data block of a distributed system, where the secret key of the apparatus uniquely corresponds to a public key of the apparatus, and the distributed system includes the first node, the second node and the apparatus.

According to yet another aspect of the disclosure, a computer device is provided, which includes a memory, a processor and computer instructions which are stored in the memory and executable on the processor, where the processor implements the steps of the distributed voting methods in above-mentioned embodiments when executing the instructions.

According to yet another aspect of the disclosure, a readable storage medium storing computer instructions thereon is provided, where the instructions, when executed by a processor, cause the processor to implement the steps of the distributed voting methods in above-mentioned embodiments.

DETAILED DESCRIPTION OF THE EMBODIMENTS

Figure 1:
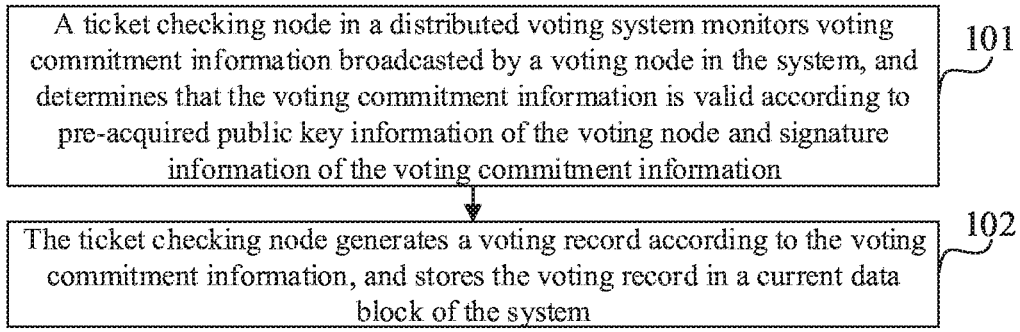
FIG. 1 is a flow chart of a distributed voting method provided by an embodiment of the disclosure.

The exemplary embodiments will be illustrated here in details, and the examples thereof are represented in the drawings. When the following description relates to the drawings, the same numbers represent the same or similar elements in the different drawings, unless otherwise indicated. The implementation modes described in the following exemplary embodiments do not represent all the implementation modes consistent with the disclosure. On the contrary, they are only the examples of the devices and methods which are detailed in the attached claims and consistent with some aspects of the disclosure.

At present, an online platform may hold a promotion activities (e.g., a voting evaluation activity of the artistic works and the like) on the platform regularly or irregularly; however, the online platform requires the organizer to participate in the voting process, that is, the current voting system adopts the centralized approach, so that the voting process is not open and transparent, and it is easy to breed fraud, cheat and other actions, resulting in the unreliable voting result and the lack of security.

In order to solve the above problem, an embodiment of the disclosure provides a distributed voting method, and FIG. 1 is a flow chart of the distributed voting method shown by the embodiment of the disclosure. The distributed voting method provided by the embodiment of the disclosure may be applied to the distributed voting system constituted by a plurality of blockchain devices, and each blockchain device constitutes a node in the system. Since all the nodes are equal in status, each node may switch among three roles: ticket checking node, voting node and participating node, or play two or three roles at the same time. Here the participating node refers to the node that co-initiates or responds to the voting activity and uploads the object to be voted; the voting node refers to the node that responds to the voting activity and votes for the object to be voted; and the ticket checking node refers to the node that writes the voting trade to the distributed voting system.

It is necessary to note that the voting activity in this embodiment may be initiated by a cloud platform (server) or jointly initiated by a plurality of participating nodes.

For example, when the voting activity is initiated by the cloud platform, the user enters the system through any node in the distributed voting system to check the voting activity, and then each node may upload the corresponding object to be voted in response to the voting activity, where these nodes become the participating nodes. At the same time, each node in the distributed voting system may appreciate the object to be voted and vote for each object to be voted in response to the voting activity, where these nodes become the voting nodes. The specific content of the voting or verification refers to the subsequent embodiments and is not described here.

In another example, when the voting activity is jointly initiated by a plurality of participating nodes, one node in the distributed voting system may initiate the voting activity invitation through the system, and other nodes in the system may accept the voting activity invitation. When the number of the participating nodes reaches a certain number, such as 3-5, the voting activity takes effect, these nodes become the participating nodes, and the system prompts each participating node to upload the object to be voted. Then each node in the system may act as the voting node to vote for the object to be voted, and each node in the system may act as the ticket checking node to verify the voting requests of the voting nodes. The specific content refers to the subsequent embodiments and is not described here.

For the sake of description, the distributed voting method provided by the embodiment of the disclosure is described for example in the scenario where the distributed voting system is an online art gallery, the object to be voted is an artistic work, and each node in the online art gallery vote for one or more artistic works in the embodiments of the disclosure, but this scenario does not limit the present application. As shown in FIG. 1, the distributed voting method may include steps 101 and 102.

In the step 101, the ticket checking node in the distributed voting system monitors the voting commitment information broadcasted by the voting node in the system, and determines that the voting commitment information is valid according to the pre-acquired public key information of the voting node and the signature information of the voting commitment information.

Here, the voting commitment information is generated by the voting node according to the voting invitation information broadcasted by the participating node, and the voting commitment information includes the identity information of the voting node, the identity information of the object to be voted, the voting time information, and the signature information generated by the voting node according to its own secret key for the voting commitment information. The secret key of the voting node uniquely corresponds to the public key of the voting node.

According to an embodiment of the disclosure, after the participating node uploads the artistic work (object to be voted), the user may appreciate the artistic work through the node in the system, and may further respond to the voting activity for the artistic work. The participating node may broadcast the voting invitation information to other nodes in the system. The voting invitation information may include the participating node identity, the identity information of the artistic work, and other content related to the voting activity (referred to as participating data hereafter). Other nodes in the system may vote for the artistic work as the voting nodes in response to the voting activity. The voting node may generate the voting commitment information (referred to as voting data hereafter) for the participating node.

According to an embodiment of the disclosure, the artistic work may include photography work, painting work, literature work or television work, or even the artistic form played and displayed on the device terminal, which is not limited here.

Figure 2:
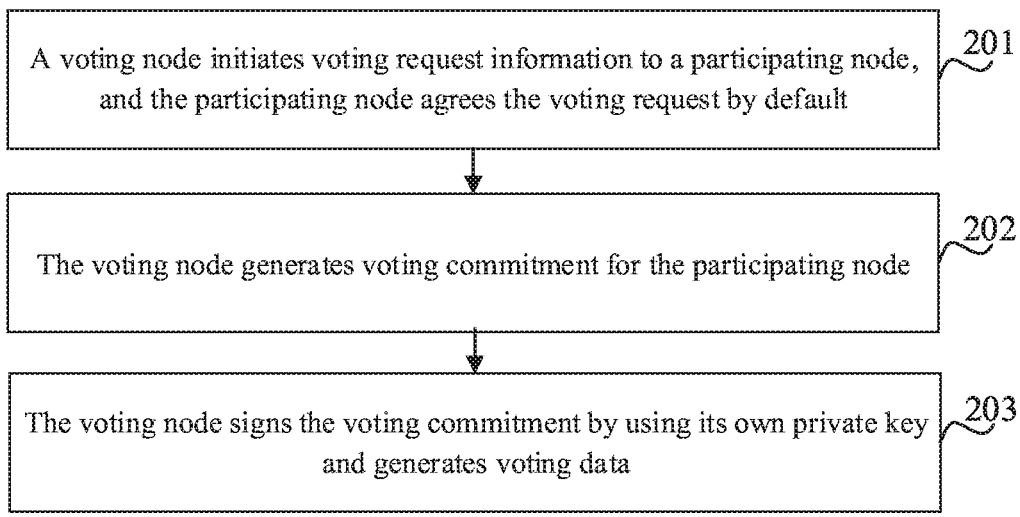
FIG. 2 is a flow chart of generating the voting data provided by an embodiment of the disclosure.

According to an embodiment of the disclosure, as shown in FIG. 2, the generating of the voting data by the voting node according to the participating data may specifically includes steps 201-203.

In the step 201, the voting node initiates the voting request information to the participating node, and the participating node agrees the voting request by default.

In the step 202, the voting node generates the voting commitment for the participating node. For example, the voting node generates the random string as the voting commitment, written as P=TvoteC, where P is the voting commitment, T represents the identity information of the voting node, and C represents the identity information of the participating node or the identity information of the artistic work.

In the step 203, the voting node signs the voting commitment by using its own private key and generates the voting data. The format of the voting data may be:

$$S=\text{Sign}(\text{Pri}_{TC}, P/T_{timestamp});$$

where S represents the voting data, $\text{Pri}_{TC}$ represents the private key of the voting node, and $P/T_{timestamp}$ represents the timestamp, i.e., the voting time information (the time of forming the trade).

According to an embodiment of the disclosure, after the cloud platform (server) or a plurality of participating nodes initiate(s) the voting activity, the system may randomly generate a pair of public and private keys for each node (or the user corresponding to each node). Before the voting node initiates the voting request information to the participating node, the voting node may bind its own identity information with the public key to generate the public key certificate (public key information) and publish the public key certificate to the system, so that other nodes (the ticket checking nodes) in the system obtain the public key certificate of the voting node and verify the voting data broadcasted by the voting node according to the public key certificate of the voting node.

In an embodiment, after the voting node broadcasts the voting data to other nodes in the system, the node monitoring the voting data at this time may act as the ticket checking node. The ticket checking node may verify whether the voting data is valid by using the asymmetric encryption algorithm. In an embodiment, the ticket checking node may determine that the voting data is edited and generated by the voting node according to the pre-acquired public key certificate of the voting node and the signature information of the voting data.

According to an embodiment of the disclosure, the ticket checking node may further determine whether the account balance corresponding to the voting node is above the voting amount according to the identity information of the voting node and the historical voting records stored in the system. The voting amount is the amount that the voting node needs to pay to the participating node for the current voting.

According to an embodiment of the disclosure, in the event that the voting data is edited by the voting node and the account balance of the voting node is above the voting amount, the ticket checking node determines that the voting data is the valid voting data. Otherwise it is the invalid voting data. Of course, those skilled in the art may further adjust the verification condition according to the specific scenario for the purpose of judging whether the voting data is valid, and the scheme of the present application may also be realized.

According to an embodiment of the disclosure, since each voting behavior (voting data) serves as one voting trade, after receiving the voting trade, the ticket checking node may check: firstly whether the voting trade is reliable in the system, where the ticket checking node may run the check script against the output of each preorder trade to ensure that the returned result is true. Secondly whether there are double payments. Thirdly whether the node has received the voting trade. Fourthly the node receives and passes only the standard scripts on the whitelist. The specific check method may refer to the relevant technology, which is not limited here.

In the step 102, the ticket checking node generates the voting record according to the voting commitment information, and stores the voting record in the current data block of the system.

In the embodiment, the process during which the voting node generates the voting data is considered as one voting trade, and the voting trade is written to the smart contract in advance. In the case when the voting data is valid, the ticket checking node may trigger the smart contract to take effect. The content of the smart contract is to write the voting trade (the voting record) between the voting node and the participating node to the current data block.

According to an embodiment of the disclosure, after the voting trade is written to the current data block, the voting node may reduce the account balance corresponding to the voting node according to the voting amount; that is, after the trade is completed, the account balance corresponding to the voting node is reduced by one voting amount. Accordingly, the participating node may increase the account balance corresponding to the participating node according to the voting amount and update the vote result of the artistic work; that is, after the trade is completed, the account balance corresponding to the voted participating node is increased by one voting amount, and the vote result of the artistic work is also changed accordingly.

According to an embodiment of the disclosure, the current data block of the system may be obtained as follows: the ticket checking node determines the input value causing the output value of the first preset algorithm to meet the set condition; the ticket checking node generates the current data block according to the output value and the identity information of the data block generated most recently in the system; and the ticket checking node broadcasts the input value, the output value and the identity information of the current data block so that other nodes in the system confirms that the current data block corresponding to the identity information of the current data block is generated according to the input value, the output value and the first preset algorithm.

At this point, in this embodiment, the voting trades of the voting nodes are written to the blockchain system so that all the nodes in the system can consult the voting information, thus increasing the transparency of the voting process and enhancing the reliability of the voting process. And in this embodiment, after the voting process is written to the current data block as one trade, it cannot be tampered, which is conducive to improving the security of the voting process.

According to an embodiment of the disclosure, when the online art gallery initiates the voting activity or a plurality of participating nodes jointly initiate the voting activity, the online art gallery add the first set value in the account of each node in the system or add the first set value in the account of each voting node. For example, when the node A in the system is ready to vote for the participating node, the online art gallery allocates three voting coins to the account of the node A so that is convenient for the node A to vote. Thus, through allocating the voting coins to the voting node, it may be convenient for the voting node to pay the certain voting amount (e.g., 1 voting coin) to the participating node in the voting process, that is, the payment transaction in which the voting node pays the voting coins to the participating node is regarded as one voting trade.

According to an embodiment of the disclosure, when a user registers, the online art gallery may directly add the second set value in the user's account according to the preset algorithm; that is, the user can participate in the voting activity the second set value times, and then the user needs to recharge and participate in checking the tickets or create the data block to get a reward, and uses the reward to continue to participate in the voting activities.

According to an embodiment of the disclosure, the ticket checking node may further increase the account balance corresponding to the ticket checking node according to the third preset value in response to that other nodes in the system confirms that the current data block is generated. In the distributed system, the more nodes, the more stable the data chain, so in order to make the voting system more stable, more participated nodes are needed, that is, more behaviors of verifying the voting are needed, and the voting records are packaged into the data block and added to the system. But the ticket checking node will not do the voluntary labor, so the distributed voting system may establish the reward mechanism, and the ticket checking nodes check the tickets competitively. For example, the ticket checking node is rewarded 100 art coins whenever it generates a new data block, where the art coins may be used in the online art gallery for buying the digital paintings or other transaction behaviors.

According to an embodiment of the disclosure, the reward mechanism makes the ticket checking node have the motivation to verify and record the voting behavior, and the joining of more and more ticket checking nodes also make the blockchain structure more stable. At the same time, due to the increase in the voting behaviors, the number of the data block is increased and the blockchain becomes longer, so that it is difficult to tamper the voting behaviors recorded in the blockchain, and since each node can view the entire ledger of the blockchain, the voting process is more open and transparent.

Figure 3:
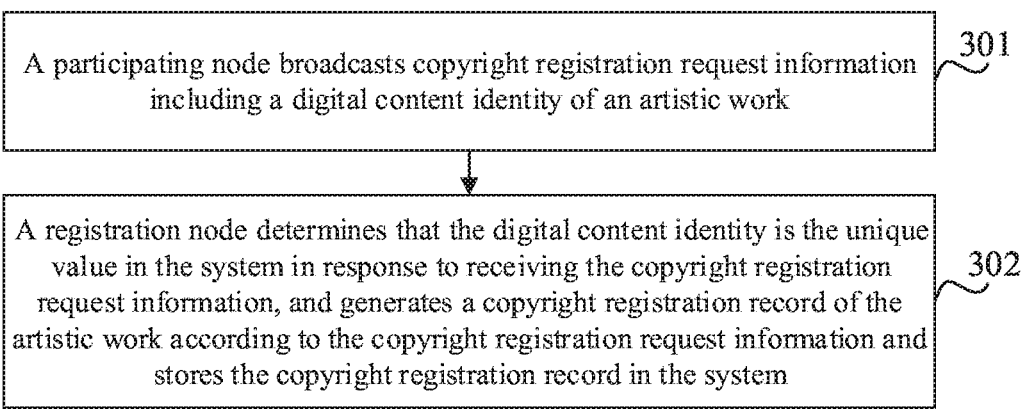
FIG. 3 is a flow chart of a copyright registration method provided by an embodiment of the disclosure.

According to an embodiment of the disclosure, after the online art gallery initiates the voting activity, e.g., the evaluation activity of the artistic works, and when or after all the participating nodes upload the artistic works, they may further request for the copyright registration of the artistic works; other nodes in the system may also be used as the registration nodes to perform the copyright registration of the artistic works. As shown in FIG. 3, the copyright registration method may include steps 301-302.

In the step 301, the participating node broadcasts the copyright registration request information including the digital content identity of an artistic work.

According to an embodiment of the disclosure, the participating node may generate the content identity of the artistic work based on the second preset algorithm and the content information of the artistic work; and generate the digital content identity based on the third preset algorithm, the content identity of the artistic work and the copyright owner identity information of the artistic work.

In an implementation, the copyright owner identity information of the artistic work is the public key of the participating node.

In the step 302, the registration node determines that the digital content identity is the unique value in the system in response to receiving the copyright registration request information; and generates the copyright registration record of the artistic work according to the copyright registration request information and stores the copyright registration record in the system.

According to an embodiment of the disclosure, before determining that the digital content identity is the unique value in the system, the registration node may further determine that the copyright registration request information further includes at least one of status information of a copyright owner of the artistic work, the right statement information of the artistic work, status information of an author of the artistic work and address information of the copyright owner of the artistic work. That is, the registration node verifies the information integrity in the copyright registration request information.

According to an embodiment of the disclosure, the copyright registration request information may further include the signature information generated by the participating node according to its own secret key for the copyright registration request information; so in the step 302, the registration node may further determine that the copyright registration request information is edited and generated by the participating node according to the pre-acquired public key information of the participating node and the signature information of the copyright registration request information before generating the copyright registration record of the artistic work according to the copyright registration request information; where the secret key of the participating node uniquely corresponds to the public key of the participating node.

The distributed voting method in the embodiments of the disclosure will be described in details in combination with the specific examples.

Figure 4:
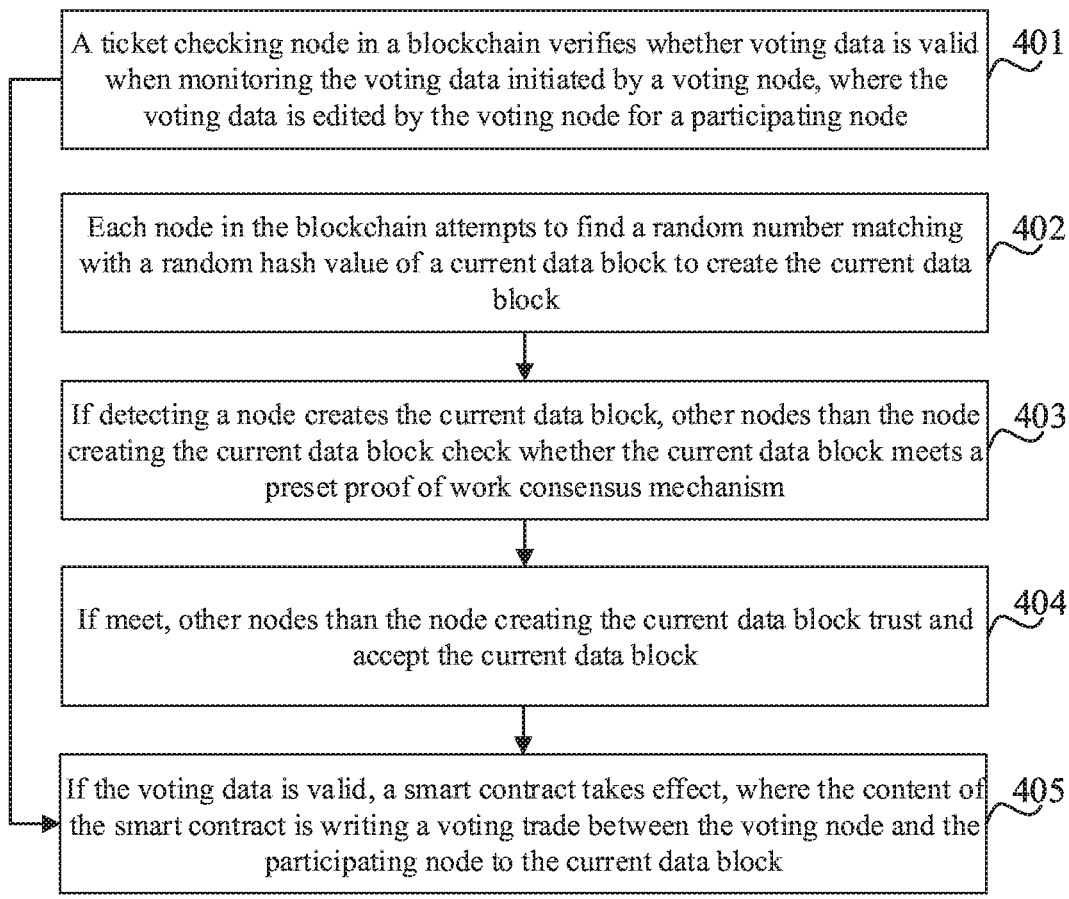
FIG. 4 is another flow chart of a distributed voting method provided by an embodiment of the disclosure.

As shown in FIG. 4 which is another flow chart of the distributed voting method in the embodiment of the disclosure, this distributed voting method may include steps 401-405.

In the step 401, the ticket checking node in the blockchain verifies whether the voting data is valid when monitoring the voting data initiated by the voting node; where the voting data is edited by the voting node for the participating node.

The specific implementation method and principle of the step 401 is the same as those of the step 101, and the detailed description thereof can refer to the relevant content of the step 101 in FIG. 1 and will be omitted here.

In the step 402, each node in the blockchain attempts to find the random number matching with the random hash value of the current data block to create the current data block.

In order to ensure the stability and reliability of the blockchain data, it is necessary to increase the number of the nodes in the blockchain as much as possible. Therefore, in an implementation, more blockchain devices are required to participate in the verification and voting and write the voting trades to the blockchain.

In an implementation, each node in the blockchain attempts to find a random number (Nounce) that matches with the random hash value of the current data block. After many attempts, one node in the blockchain may find a random number that meets the above requirement, thereby obtaining the right to create one block, i.e., the current data block. This node broadcasts the event of finding the correct random number to other nodes in the blockchain.

In the step 403, if detecting a node creates the current data block, other nodes than the node creating the current data block check whether the current data block meets the preset proof of work consensus mechanism.

In an implementation, after detecting a node creates the current data block, other nodes in the blockchain check whether the current data block meets the preset Proof of Work (POW) consensus mechanism. Here, the POW consensus mechanism may be implemented according to the solutions in the related technology, which is not limited here.

In the step 404, if meet, other nodes than the node creating the current data block trust and accept the current data block.

In an implementation, when the current data block meets the POW consensus mechanism, other nodes determine that the current data block is obtained through the honest labor of the node, and thus trust and accept the current data block. Otherwise, they do not trust the current data block.

In order to motivate each node in the blockchain to participate in ticket checking, in an implementation, the online art gallery may preset the algorithms to add the second value to the account of the node creating the current data block. For example, when a ticket checking node firstly finds the random number, the online art gallery allows this ticket checking node to record the transactions in the block during this period. At the same time, the transactions during this period further includes a special transaction, namely reward. The input content of this special transaction is empty, and the output content is the address of the ticket checking node that firstly finds the random number, so that the online art gallery may reward the account of the node creating the current data block, such as 100 art coins. Then, the user of the node may appreciate the artistic work in the online art gallery, and purchase the ownership of the artistic work or perform other transaction behaviors.

As can be seen, according to the embodiments of the disclosure, the reward mechanism may attract more and more blockchain nodes to participate in checking the tickets and establishing the new blocks, so as to ensure the more stable blockchain structure. At the same time, due to the increase in the voting behaviors and the increase in the number of blocks, the block chain may become longer, so that it is more difficult to tamper the voting data recorded in the block chain.

It is necessary to note that, in an implementation, the execution sequence of the steps 402-404 and the step 401 is not limited, that is, steps 402-404 may precede or follow the step 401, or may be executed simultaneously with the step 401, which is not limited in this embodiment.

In the step 405, if the voting data is valid, the smart contract takes effect, where the content of the smart contract is to write the voting trade between the voting node and the participating node to the current data block.

The specific implementation method and principle of the step 405 is the same as those of the step 102, and the detailed description thereof can refer to the relevant content of the step 102 in FIG. 1 and will be omitted here.

At this point, according to the embodiments of the disclosure, the setting of the reward mechanism may attract more blockchain nodes to join in checking the tickets and establishing the new blocks, so as to ensure the longer blockchain and ensure that the voting data is not tampered, thus improving the security of the voting process. Moreover, each node in the blockchain writes the voting trades of the voting nodes to the blockchain, so that all the nodes in the blockchain can consult the voting information, thus increasing the transparency of the voting process and enhancing the reliability of the voting process.

Figure 5:
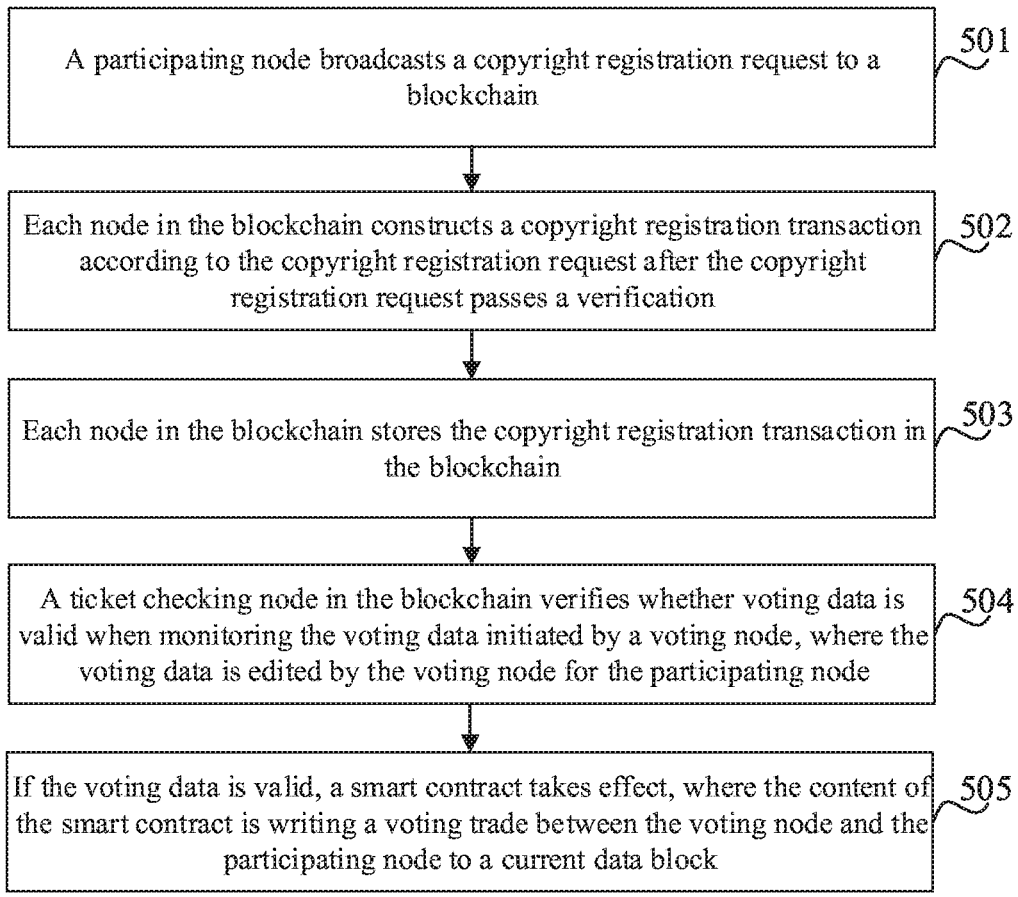
FIG. 5 is yet another flow chart of a distributed voting method provided by an embodiment of the disclosure.

As shown in FIG. 5 which is yet another flow chart of the distributed voting method in the embodiment of the disclosure, this distributed voting method may include steps 501-505.

In the step 501, the participating node broadcasts the copyright registration request to the blockchain.

In an implementation, when a plurality of users jointly initiate the voting activity through the blockchain devices (i.e., the participating nodes) or the online art gallery initiates the voting activity, the user may upload the artistic work through the corresponding blockchain device. When uploading the artistic work, the user may specify the ownership of the artistic work through the copyright registration request, where the copyright registration request may include one or more of the address of the copyright owner, the identity information of the copyright owner, the signature of the copyright owner, the copyright statement, and the digital content identity of the artistic work. The copyright statement may further contain the basic information of the digital content and/or the description of the rights status of the artistic work, the basic information of the digital content includes the digital content overview and/or evaluation.

In an implementation, the signature of the copyright owner refers to the result of the encryption operation performed on any string of numbers (for example, the digital content of the artistic work, the digital content identity of the artistic work) by using the private key of the copyright owner. Moreover, the signature can be verified by the public key, and the passing of the verification means that the signed digital content is published by the public key owner and is trusted; otherwise the signed data is forged and untrusted. The private and public keys are in one-to-one correspondence, generated during the registration of the copyright owner, and may be 256 bits or more in length.

In an implementation, the address of the copyright owner may be generated in advance, and when a user registers with the online art gallery, he or she can get an address of the copyright owner. In this embodiment, the address of the copyright owner may be generated by using the public key of the copyright owner, for example, the address may be the public key of the copyright owner itself, or the public key hash value generated by hashing the public key of the copyright owner according to a hash algorithm, or a script segment containing the public key or other forms, and is guaranteed to be unique in the whole network.

In an implementation, the blockchain device performs the hash operation on the digital content (i.e., artistic work) by using the preset hash algorithm to obtain the hash value of digital content. Then the blockchain device performs the hash operation on the hash value of the digital content and the identity information of the copyright owner (e.g., the address of the copyright owner) by using the preset hash algorithm (or another hash algorithm) to obtain the digital content identity, that is, the digital content identity=hash (the hash value of the digital content+the identity information of the copyright owner).

In an implementation, the hash algorithm may be the Secure Hash Algorithm (SHA1) or Message-Digest Algorithm 5 (MD5). Of course, technicians may also choose other algorithms to replace the hash algorithm. In the case of implementing the above scheme, the corresponding scheme and algorithm also fall into the protection scope of the present application.

In the step 502, each node in the blockchain constructs the copyright registration transaction according to the copyright registration request after the copyright registration request passes the verification.

Figure 6:
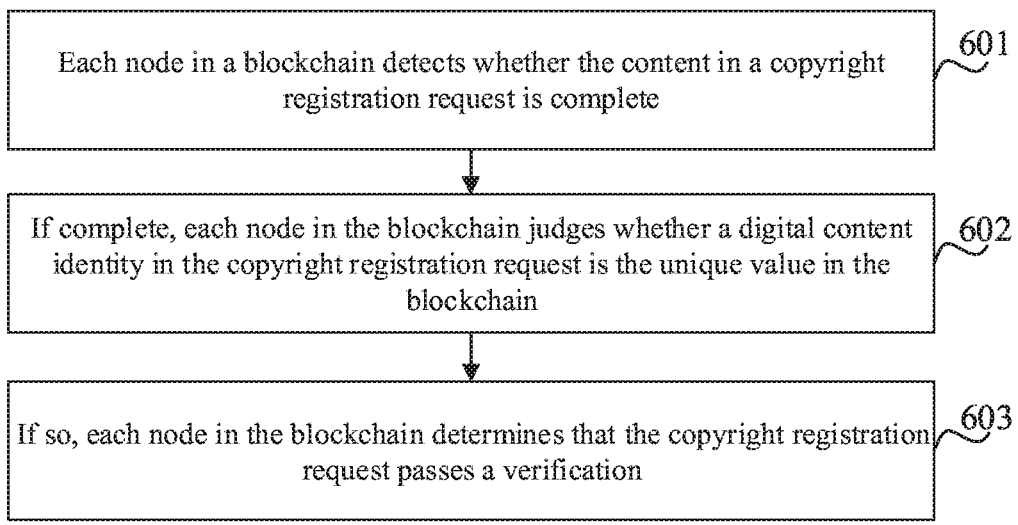
FIG. 6 is a flow chart of checking the copyright registration request provided by an embodiment of the disclosure.

In an implementation, as shown in FIG. 6, each node in the blockchain verifies the copyright registration request after receiving the copyright registration request, which may include steps 601-603.

In the step 601, each node in the blockchain detects whether the content in the copyright registration request is complete.

Figure 7:
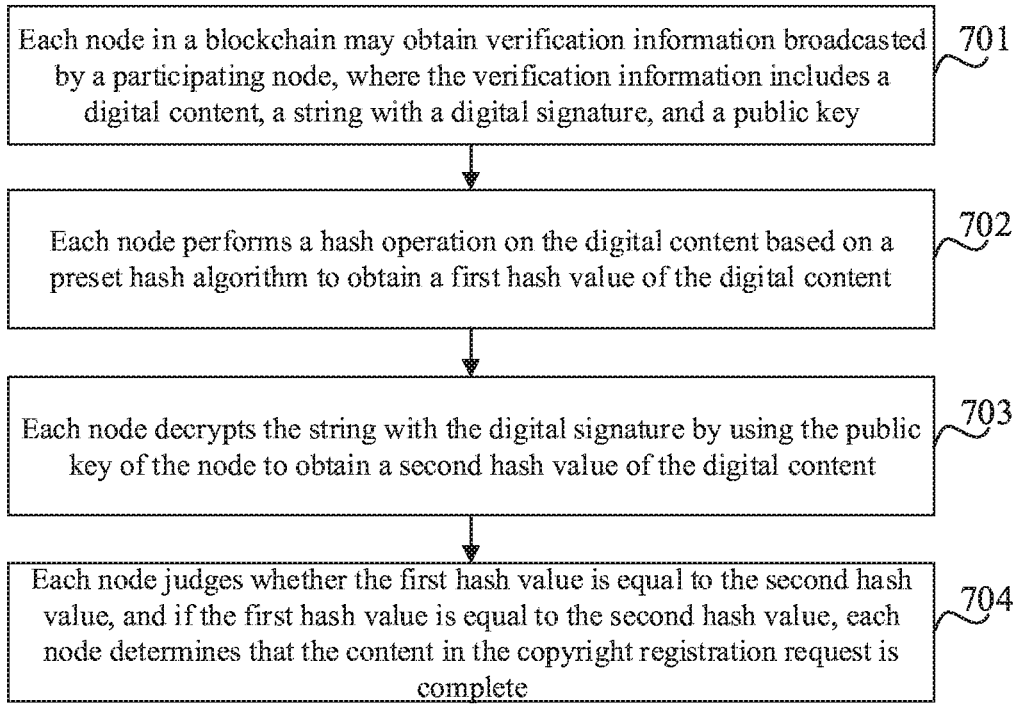
FIG. 7 is a flow chart of checking the copyright registration request content provided by an embodiment of the disclosure.

Referring to FIG. 7, each node in the blockchain may obtain the verification information broadcasted by the participating node, where the verification information includes at least the digital content, the string with the digital signature, and the public key (corresponding to the step 701). Then each node performs the hash operation on the digital content based on the preset hash algorithm to obtain the first hash value of the digital content (corresponding to the step 702). Then each node decrypts the string with the digital signature by using the public key of the node to obtain the second hash value of the digital content (corresponding to the step 703). Finally, each node judges whether the first hash value is equal to the second hash value, and if the first hash value is equal to the second hash value, each node determines that the content in the copyright registration request is complete (corresponding to the step 704), otherwise the content is incomplete.

In the step 602, if complete, each node in the blockchain judges whether the digital content identity in the copyright registration request is the unique value in the blockchain.

Based on the calculation formula of the digital content identity, each node may obtain the digital content identity corresponding to the copyright registration request, and each node may match the digital content identity in the verification information with the digital content identity in its respective block, so as to determine whether the digital content identity in the verification information is the unique value.

In the step 603, if so, each node in the blockchain determines that the copyright registration request passes the verification.

In an implementation, if the digital content identity is the unique value, each node determines that the copyright registration request is edited by the node that broadcasts the copyright registration request and is trusted, that is, each node determines that the copyright registration request passes the verification, to thereby ensure the authenticity, correctness and legality of the copyright registration. Then each node in the blockchain may construct the copyright registration transaction according to the copyright registration request. The solution of constructing the copyright registration transaction may refer to the relevant technology, which is not limited here.

In the step 503, each node in the blockchain stores the copyright registration transaction in the blockchain.

In an implementation, each node in the blockchain may store the copyright registration transaction in the blockchain, so that it is difficult to alter the copyright management transaction, which further ensures the unalterability of the copyright management transaction and the uniqueness of the time proof.

When the copyright is registered, there is no information related to the copyright in the blockchain, that is, the copyright is new, so each node sets the input content contained in the copyright management transaction as null and sets the output content as the address of the copyright owner in this embodiment. Thus, after the copyright is registered, the blockchain records that the copyright of the artistic work belongs to the copyright owner.

In the step 504, the ticket checking node in the blockchain verifies whether the voting data is valid when monitoring the voting data initiated by the voting node; where the voting data is edited by the voting node for the participating node.

The specific implementation method and principle of the step 504 is the same as those of the step 101 in FIG. 1, and the detailed description thereof can refer to the relevant content of the step 101 in FIG. 1 and will be omitted here.

In the step 505, if the voting data is valid, the smart contract takes effect, where the content of the smart contract is to write the voting trade between the voting node and the participating node to the current data block.

The specific implementation method and principle of the step 505 is the same as those of the step 102 in FIG. 1, and the detailed description thereof can refer to the relevant content of the step 102 in FIG. 1 and will be omitted here.

According to the embodiments of the disclosure, the credibility of the artistic work copyright in the online art gallery can be ensured by registering the copyright of the artistic work and ensuring the unique existence of the copyright in the blockchain to prevent the artistic work from being copied. And in this embodiment, each node in the blockchain writes the voting trades of the voting nodes to the blockchain, so that all the nodes in the blockchain can consult the voting information, thus increasing the transparency of the voting process and enhancing the reliability of the voting process.

An embodiment of the disclosure further provides a distributed voting system, which may include: a first node configured to broadcast the voting invitation information; a second node configured to generate the voting commitment information according to the voting invitation information and broadcast the voting commitment information, where the voting commitment information includes the first signature information generated by the second node according to its own secret key for the voting commitment information; and a third node configured to determine that the voting commitment information is valid according to the pre-acquired public key information of the second node and the first signature information in response to receiving the voting commitment information, where the secret key of the second node uniquely corresponds to a public key of the second node; and generate the voting record according to the voting commitment information and store the voting record in the first data block of the system.

According to an embodiment of the disclosure, the voting invitation information includes the identity information of an object to be voted, and the voting commitment information further includes the identity information of the second node, the identity information of the object to be voted and the voting time information; and the third node is configured to generate the voting record including the identity information of the second node, the identity information of the object to be voted and the voting time information.

According to an embodiment of the disclosure, the third node may be configured to determine that the voting commitment information is edited and generated by the second node according to the public key information of the second node and the first signature information; and determine that the account balance corresponding to the second node is not below the first preset value according to the identity information of the second node and the historical voting records stored in the system.

According to an embodiment of the disclosure, the second node may be configured to send the voting request information to the first node; and reduce the account balance corresponding to the second node according to the first preset value; and the first node is configured to increase the account balance corresponding to the first node and update the vote result of the object to be voted according to the first preset value in response to receiving the voting request information.

According to an embodiment of the disclosure, the distributed voting system may further include: a fourth node or cloud platform configured to broadcast the voting launch information; where the first node may be configured to broadcast the voting invitation information in response to receiving the voting launch information; and the second node may be configured to increase the account balance corresponding to the second node according to the second preset value in response to receiving the voting launch information; and broadcast the public key information of the second node, where the public key information of the second node includes the identity information of the second node and the public key of the second node.

According to an embodiment of the disclosure, the third node may be configured to determine the input value causing the output value of the first preset algorithm to meet the set condition; generate the first data block according to the output value and the identity information of the data block generated most recently in the system; and broadcast the input value, the output value and the identity information of the first data block so that other nodes in the system confirms that the first data block corresponding to the identity information of the first data block is generated according to the input value, the output value and the first preset algorithm.

According to an embodiment of the disclosure, the third node may be configured to increase the account balance corresponding to the third node according to the third preset value in response to that other nodes in the system confirms that the first data block is generated.

According to an embodiment of the disclosure, the first node may be configured to broadcast the copyright registration request information including the digital content identity of the object to be voted; where the distributed voting system may further include: a fifth node configured to determine that the digital content identity is the unique value in the system in response to receiving the copyright registration request information; and generate the copyright registration record of the object to be voted according to the copyright registration request information and store the copyright registration record in the second data block of the system.

According to an embodiment of the disclosure, the first node may be configured to generate the content identity of the object to be voted based on the second preset algorithm and the content information of the object to be voted; and generate the digital content identity based on the third preset algorithm, the content identity of the object to be voted and the copyright owner identity information of the object to be voted.

According to an embodiment of the disclosure, the copyright owner identity information of the object to be voted may be the public key of the first node.

According to an embodiment of the disclosure, the fifth node may be configured to determine that the copyright registration request information further includes at least one of the status information of the copyright owner of the object to be voted, the right statement information of the object to be voted, the status information of the author of the object to be voted and the address information of the copyright owner of the object to be voted before determining that the digital content identity is the unique value in the system.

According to an embodiment of the disclosure, the copyright registration request information may further include the second signature information generated by the first node according to its own secret key for the copyright registration request information; the fifth node may be configured to determine that the copyright registration request information is edited and generated by the first node according to the pre-acquired public key information of the first node and the second signature information; where the secret key of the first node uniquely corresponds to the public key of the first node.

In the embodiment of the disclosure, the voting trades of the voting nodes are written to the blockchain so that all the nodes in the blockchain can consult the voting information, thus increasing the transparency of the voting process and enhancing the reliability of the voting process. And, after the voting process is written to the current data block as one trade, it cannot be tampered, which is conducive to improving the security of the voting process.

Figure 8:
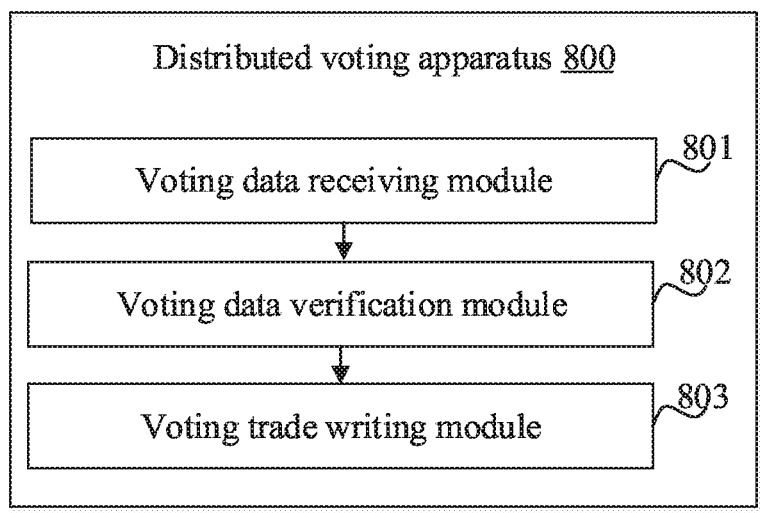
FIG. 8 is a structural schematic diagram of a distributed voting apparatus provided by an embodiment of the disclosure.

An embodiment of the disclosure further provides a distributed voting apparatus, and FIG. 8 is a structural schematic diagram of a distributed voting apparatus shown by the embodiment of the disclosure. The distributed voting apparatus 800 may include: a voting data receiving module 801 configured to receive the voting commitment information broadcasted by a first node, where the voting commitment information is generated by the first node according to the voting invitation information broadcasted by a second node, and the voting commitment information includes the identity information of the first node, the identity information of the object to be voted, the voting time information, and the signature information generated by the first node according to its own secret key for the voting commitment information; a voting data verification module 802 configured to determine that the voting commitment information is valid according to the pre-acquired public key information of the first node and the signature information, where the secret key of the first node uniquely corresponds to the public key of the first node; and a voting trade writing module 803 configured to generate the voting record according to the voting commitment information, and store the voting record in the current data block of the distributed system including the distributed voting apparatus, the first node and the second node.

According to an embodiment of the disclosure, the voting data verification module 802 may be configured to determine that the voting commitment information is edited and generated by the first node according to the public key information of the first node and the signature information;

and determine that the account balance corresponding to the first node is not below the preset value according to the identity information of the first node and the historical voting records stored in the system.

According to an embodiment of the disclosure, the distributed voting apparatus 800 may further include a data block establishing module (not shown in the figure) configured to determine the input value causing the output value of the preset algorithm to meet the set condition; generate the current data block according to the output value and the identity information of the data block generated most recently in the distributed system; and broadcast the input value, the output value and the identity information of the current data block so that other nodes in the distributed system confirms that the current data block corresponding to the identity information of the current data block is generated according to the input value, the output value and the preset algorithm.

At this point, in the embodiment of the disclosure, the voting trades of the voting nodes are written to the blockchain so that all the nodes in the blockchain can consult the voting information, thus increasing the transparency of the voting process and enhancing the reliability of the voting process. And, after the voting process is written to the current data block as one trade, it cannot be tampered, which is conducive to improving the security of the voting process.

Figure 9:
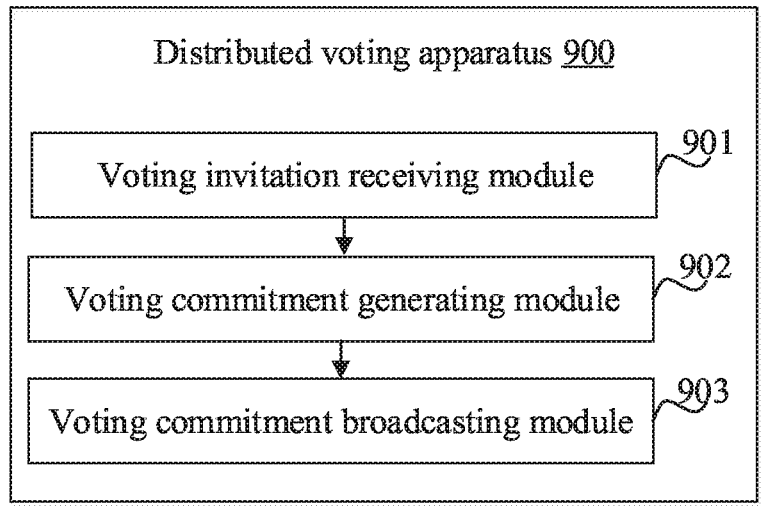
FIG. 9 is a structural schematic diagram of another distributed voting apparatus provided by an embodiment of the disclosure.

An embodiment of the disclosure further provides another distributed voting apparatus, and FIG. 9 is a structural schematic diagram of another distributed voting apparatus shown by the embodiment of the disclosure. The distributed voting apparatus 900 may include: a voting invitation receiving module 901 configured to receive the voting invitation information broadcasted by a first node, where the voting invitation information includes the identity information of the object to be voted; a voting commitment generating module 902 configured to generate the voting commitment information according to the voting invitation information, where the voting commitment information includes the identity information of the apparatus, the identity information of the object to be voted, the voting time information, and the signature information generated by the apparatus according to its own secret key for the voting commitment information; and a voting commitment broadcasting module 903 configured to broadcast the voting commitment information so that a second node determines that the voting commitment information is valid according to the pre-acquired public key information of the apparatus and the signature information, generate the voting record according to the voting commitment information, and storing the voting record in the current data block of a distributed system; where the secret key of the apparatus uniquely corresponds to the public key of the apparatus, and the distributed system includes the first node, the second node and the apparatus.

Figure 10:
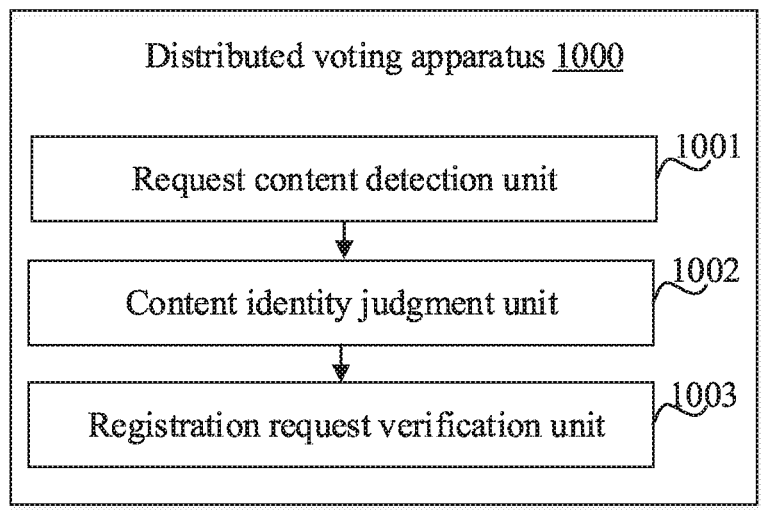
FIG. 10 is a structural schematic diagram of yet another distributed voting apparatus provided by an embodiment of the disclosure.

An embodiment of the disclosure further provides yet another distributed voting apparatus, and FIG. 10 is a structural schematic diagram of yet another distributed voting apparatus shown by the embodiment of the disclosure. The distributed voting apparatus 1000 may include: a request content detection unit 1001 configured to detect whether the content in the copyright registration request is complete when receiving the copyright registration request; a content identity judgment unit 1002 configured to judge whether the digital content identity in the copyright registration request is the unique value in the blockchain when the content in the copyright registration request is complete; and a registration request verification unit 1003 configured to determine that the copyright registration request passes the verification when the digital content identity is the unique value in the blockchain.

According to an embodiment of the disclosure, the distributed voting apparatus 1000 may be configured to set the input content in the copyright registration transaction as null, and set the output content as the copyright owner's address. Thus the copyright registration of the artistic work can be completed in the block chain.

Figure 11:
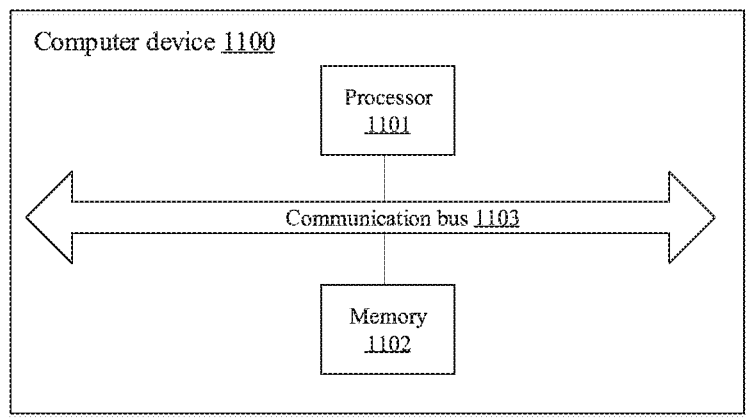
FIG. 11 is a structural schematic diagram of a computer device provided by an embodiment of the disclosure.

An embodiment of the disclosure further provides a computer device, and referring to FIG. 11, the computer device includes a processor 1101, a memory 1102 and the computer instructions which are stored in the memory and executable on the processor 1101, where the processor 1101 and the memory 1102 are connected via the communication bus 1103, and the processor 1101 can read the instructions from the memory to implement the method steps implemented by the ticket checking node, the voting node or the participating node in the distributed voting methods provided by the embodiments of the disclosure.

An embodiment of the disclosure further provides a readable storage medium storing the computer instructions thereon, where the instructions, when executed, implement the method steps implemented by the ticket checking node, the voting node or the participating node in the distributed voting methods provided by the embodiments of the disclosure.

In the disclosure, the terms "first" and "second" are only for purpose of description, and cannot be construed to indicate or imply the relative importance. The term "a plurality of" refers to two or more, unless otherwise defined explicitly.

After considering the specification and practicing the disclosure herein, those skilled in the art will readily come up with other embodiments. The disclosure is intended to encompass any variations, usages or applicability changes of the disclosure, and these variations, usages or applicability changes follow the general principle of the disclosure and include the common knowledge or customary technological means in the technical field which is not disclosed in the disclosure. The specification and embodiments are illustrative only, and the true scope and spirit of the disclosure is pointed out by the following claims.

It should be understood that the disclosure is not limited to the precise structures which have been described above and shown in the figures, and can be modified and changed without departing from the scope of the disclosure. The scope of the disclosure is only limited by the attached claims.

What is claimed is:

1. A distributed voting system comprising:
   a participating node configured to broadcast voting invitation information;
   a voting node configured to generate voting commitment information according to the voting invitation information and broadcast the voting commitment information, wherein the voting commitment information comprises first signature information generated by the voting node according to its own secret key for the voting commitment information; and
   a ticket checking node configured to determine that the voting commitment information is valid according to pre-acquired public key information of the voting node and the first signature information in response to receiving the voting commitment information,
   wherein the secret key of the voting node uniquely corresponds to a public key of the voting node, a voting record is generated according to the voting commitment information and the voting record is stored in a first data block of the system, wherein the participating node is configured to broadcast copyright registration request information comprising a digital content identity of an object to be voted, and the distributed voting system further comprises a registration node configured to:

determine that the digital content identity is a unique value in the system in response to receiving the copyright registration request information, and generate a copyright registration record of the object to be voted according to the copyright registration request information and store the copyright registration record in a second data block of the system.

2. The distributed voting system according to claim 1, wherein the voting invitation information comprises identity information of an object to be voted, and the voting commitment information further comprises identity information of the voting node, the identity information of the object to be voted and voting time information; and the ticket checking node is configured to generate the voting record comprising the identity information of the voting node, the identity information of the object to be voted and the voting time information.

3. The distributed voting system according to claim 1, wherein the ticket checking node is configured to determine that the voting commitment information is edited and generated by the voting node according to the public key information of the voting node and the first signature information, and determine that an account balance corresponding to the voting node is not below a first preset value according to the identity information of the voting node and historical voting records stored in the system, the voting node is configured to send voting request information to the participating node, and reduce the account balance corresponding to the voting node according to the first preset value; and the participating node is configured to increase an account balance corresponding to the participating node and update a vote result of the object to be voted according to the first preset value in response to receiving the voting request information.

4. The distributed voting system according to claim 1, wherein a plurality of participating nodes or a cloud platform broadcast voting launch information;

wherein the participating node is configured to broadcast the voting invitation information in response to receiving the voting launch information; and the voting node is configured to increase an account balance corresponding to the voting node according to a second preset value in response to receiving the voting launch information, and broadcast the public key information of the voting node, wherein the public key information of the voting node comprises identity information of the voting node and the public key of the voting node.

5. The distributed voting system according to claim 1, wherein the ticket checking node is configured to:

determine an input value causing an output value of a first preset algorithm to meet a set condition;

generate the first data block according to the output value and identity information of a data block generated most recently in the system; and broadcast the input value, the output value and identity information of the first data block so that other nodes in the system confirms that the first data block corresponding to the identity information of the first data block is generated according to the input value, the output value and the first preset algorithm.

6. The distributed voting system according to claim 5, wherein:

the ticket checking node is configured to increase an account balance corresponding to the ticket checking node according to a third preset value in response to that the other nodes in the system confirms that the first data block is generated.

7. The distributed voting system according to claim 1, wherein the participating node is configured to generate a content identity of the object to be voted based on a second preset algorithm and content information of the object to be voted, and generate the digital content identity based on a third preset algorithm, the content identity of the object to be voted and copyright owner identity information of the object to be voted, and wherein the copyright owner identity information of the object to be voted is a public key of the participating node.

8. The distributed voting system according to claim 1, wherein:

the registration node is configured to determine that the copyright registration request information further comprises at least one of status information of a copyright owner of the object to be voted, right statement information of the object to be voted, status information of an author of the object to be voted and address information of the copyright owner of the object to be voted, before determining that the digital content identity is the unique value in the system.

9. The distributed voting system according to claim 1, wherein:

the copyright registration request information further comprises second signature information generated by the participating node according to its own secret key for the copyright registration request information; and the registration node is configured to determine that the copyright registration request information is edited and generated by the participating node according to pre-acquired public key information of the participating node and the second signature information; wherein the secret key of the participating node uniquely corresponds to a public key of the participating node.

10. A distributed voting method comprising:

receiving, by a ticket checking node, voting commitment information broadcasted by a voting node, wherein the voting commitment information is generated by the voting node according to voting invitation information broadcasted by a participating node, and the voting commitment information comprises signature information generated by the voting node according to its own secret key for the voting commitment information;

determining, by the ticket checking node, that the voting commitment information is valid according to pre-acquired public key information of the voting node and the signature information, wherein the secret key of the voting node uniquely corresponds to a public key of the voting node;

generating, by the ticket checking node, a voting record according to the voting commitment information, and storing the voting record in a first data block of a distributed system comprising the ticket checking node, the voting node, the participating node and a registration node;

broadcasting, by the participating node, copyright registration request information comprising a digital content identity of an object to be voted;

determining, by the registration node, the digital content identity is a unique value in the system in response to receiving the copyright registration request information; and generating, by the registration node, a copyright registration record of the object to be voted according to the copyright registration request information and storing the copyright registration record in a second data block of the system.

11. The distributed voting method according to claim 10, wherein the voting invitation information comprises identity information of an object to be voted, and the voting commitment information further comprises identity information of the voting node, the identity information of the object to be voted and voting time information; wherein the step of generating, by the ticket checking node, the voting record according to the voting commitment information comprises:

generating, by the ticket checking node, the voting record comprising the identity information of the voting node, the identity information of the object to be voted and the voting time information.

12. The distributed voting method according to claim 10, wherein the step of determining, by the ticket checking node, that the voting commitment information is valid comprises:

determining, by the ticket checking node, that the voting commitment information is edited and generated by the voting node according to the public key information of the voting node and the signature information; and determining, by the ticket checking node, that an account balance corresponding to the voting node is not below a preset value according to the identity information of the voting node and historical voting records stored in the distributed system.

13. The distributed voting method according to claim 10, wherein the first data block is obtained by:

determining, by the ticket checking node, an input value causing an output value of a preset algorithm to meet a set condition;

generating, by the ticket checking node, the first data block according to the output value and identity information of a data block generated most recently in the distributed system; and broadcasting, by the ticket checking node, the input value, the output value and identity information of the first data block so that other nodes in the distributed system confirms that the first data block corresponding to the identity information of the first data block is generated according to the input value, the output value and the preset algorithm.

14. A computer device comprising a memory, a processor and computer instructions which are stored in the memory and executable on the processor, wherein the processor implements the steps of the method of claim 10 when executing the instructions.

15. A readable storage medium storing computer instructions thereon, wherein the instructions, when executed by a processor, cause the processor to implement the steps of the method of claim 10.

16. A distributed voting method comprising:

receiving, by a voting node, voting invitation information broadcasted by a participating node;

generating, by the voting node, voting commitment information according to the voting invitation information, wherein the voting commitment information comprises signature information generated by the voting node according to its own secret key for the voting commitment information; and broadcasting, by the voting node, the voting commitment information so that a ticket checking node determines that the voting commitment information is valid according to pre-acquired public key information of the voting node and the signature information, generates a voting record according to the voting commitment information, and stores the voting record in a first data block of a distributed system;

broadcasting, by the participating node, copyright registration request information comprising a digital content identity of an object to be voted;

determining, by a registration node, the digital content identity is a unique value in the system in response to receiving the copyright registration request information; and generating, by the registration node, a copyright registration record of the object to be voted according to the copyright registration request information and storing the copyright registration record in a second data block of the system, wherein the secret key of the voting node uniquely corresponds to a public key of the voting node, and the distributed system comprises the voting node, second the participating node, the ticket checking node and the registration nodes.

17. The distributed voting method according to claim 16, wherein the voting invitation information comprises identity information of an object to be voted, and the voting commitment information further comprises identity information of the voting node, the identity information of the object to be voted and voting time information so that the ticket checking node generates the voting record comprising the identity information of the voting node, the identity information of the object to be voted and the voting time information.

18. A computer device comprising a memory, a processor and computer instructions which are stored in the memory and executable on the processor, wherein the processor implements the steps of the method of claim 16 when executing the instructions.

19. A readable storage medium storing computer instructions thereon, wherein the instructions, when executed by a processor, cause the processor to implement the steps of the method of claim 16.

* * * * *